United States Patent
Wang et al.

(10) Patent No.: US 9,797,578 B2
(45) Date of Patent: Oct. 24, 2017

(54) COLOR COVER/CHANGE/MIXTURE STRUCTURE OF LIGHT BULB/TUBE/FIXTURE

(71) Applicants: Shu-Bin Wang, Taichung (TW); Tzu-Yen Wang, Hsinchu (TW)

(72) Inventors: Shu-Bin Wang, Taichung (TW); Tzu-Yen Wang, Hsinchu (TW)

( * ) Notice: Subject to any disclaimer, the term of this patent is extended or adjusted under 35 U.S.C. 154(b) by 0 days.

(21) Appl. No.: 15/298,249

(22) Filed: Oct. 20, 2016

(65) Prior Publication Data
US 2017/0114985 A1    Apr. 27, 2017

(30) Foreign Application Priority Data

Oct. 22, 2015   (TW) .............................. 104216912 U

(51) Int. Cl.
| *F21V 1/00* | (2006.01) |
| *F21S 4/00* | (2016.01) |
| *F21V 17/00* | (2006.01) |
| *A01G 7/04* | (2006.01) |
| *F21S 6/00* | (2006.01) |
| *F21V 9/08* | (2006.01) |
| *H01J 61/02* | (2006.01) |
| *F21V 17/16* | (2006.01) |
| *F21Y 103/00* | (2016.01) |
| *F21Y 103/37* | (2016.01) |
| *F21V 21/14* | (2006.01) |
| *F21Y 103/30* | (2016.01) |

(52) U.S. Cl.
CPC .............. *F21V 17/002* (2013.01); *A01G 7/045* (2013.01); *F21S 6/003* (2013.01); *F21V 9/08* (2013.01); *H01J 61/025* (2013.01); *F21V 17/164* (2013.01); *F21V 21/14* (2013.01); *F21Y 2103/00* (2013.01); *F21Y 2103/30* (2016.08); *F21Y 2103/37* (2016.08)

(58) Field of Classification Search
CPC .......... F21V 17/002; F21V 9/08; F21V 21/14; F21V 17/164; F21S 6/003; H01J 61/025; A01G 7/045; F21Y 2103/30; F21Y 2103/37; F21Y 2103/00
See application file for complete search history.

(56) References Cited

U.S. PATENT DOCUMENTS

| 5,716,123 A | * | 2/1998 | Lamming | ................. F21V 3/04 362/222 |
| 6,155,695 A | * | 12/2000 | Sealy | ........................ F21V 3/04 362/237 |

(Continued)

*Primary Examiner* — Donald Raleigh
(74) *Attorney, Agent, or Firm* — Muncy, Geissler, Olds & Lowe, P.C.

(57) ABSTRACT

A color cover/change/mixture structure of a light bulb/tube/fixture includes an enclosure, a base, a cold cathode fluorescent lamp tube, and a color cover. The enclosure is a tubular body having a non-light-transmitting or light-transmitting top and a light-transmitting bottom. The base has a bottom surface having retention pawls for engaging and retaining the cold cathode fluorescent lamp tube. The cold cathode fluorescent lamp tube, after combined with the base, is disposed and mounted in the enclosure. Heads are mounted to two ends of the enclosure. The color covers have different colors and are selectively mounted to the enclosure to change the color of light emitting from the cold cathode fluorescent lamp tube.

9 Claims, 24 Drawing Sheets

(56) References Cited

U.S. PATENT DOCUMENTS

| | | | | |
|---|---|---|---|---|
| 6,183,112 B1* | 2/2001 | Bomas | ................. | F21S 8/083 |
| | | | | 362/153 |
| 8,242,667 B2* | 8/2012 | Gruber | ................. | F21V 3/02 |
| | | | | 313/25 |
| 8,915,623 B1* | 12/2014 | Claudet | ................. | F21V 3/04 |
| | | | | 362/353 |
| 2004/0150307 A1* | 8/2004 | Liao | ................. | H01J 61/78 |
| | | | | 313/19 |
| 2010/0002451 A1* | 1/2010 | Reynolds | ................. | F21S 8/02 |
| | | | | 362/363 |
| 2011/0199012 A1* | 8/2011 | Lai | ................. | H05B 41/282 |
| | | | | 315/219 |

* cited by examiner

COLOR COVER/CHANGE/MIXTURE STRUCTURE OF LIGHT BULB/TUBE/FIXTURE

TECHNICAL FIELD OF THE INVENTION

The present invention relates to an improved structure of a light fixture, which involves various color covers to allow the light fixture to generate multiple sections of different colors of irradiation light so that with such a structure of the light fixture applied to indoor plant cultivation, plants can be irradiated with irradiation light of different color spectra to timely supplement supply of light of all necessary color spectra to the cultivated plants during each phase of growth of the plants in order to achieve better, or even the best, result of growth.

DESCRIPTION OF THE PRIOR ART

Due to the progress of science and technology and the upgrading of living quality of people, indoor plant cultivation is now a new trend of planting ways and is even applied to plant factory for mass cultivation. Such indoor cultivation of plants, such as vegetables and fruits, is achieved by using a traditional fluorescent light tube or an energy saving bulb or an LED light to replace illumination achieved with sunlight for inducing photosynthesis of the plants. Besides the traditional fluorescent light tubes, energy saving bulbs, and LED lights, lighting may also be achieved with a cold cathode fluorescent lamp tube based light fixture, of which the performance is similar to those of the traditional fluorescent light tubes, energy saving bulbs, and LED lights. However, for the cold cathode fluorescent lamp tube based light fixtures or the traditional fluorescent light tubes, energy saving bulbs, and LED lights that are currently available in the market, whether they are light sources of a tubular form or a bulb form or are projection lamps or planar (panel) lamps or even other types of light fixtures, they all generates light of a single color for irradiation and it is not possible to supply different spectra of light or even to simultaneously supply multiple sections of light color spectra for change or mixture for irradiation of the light to the plants so that the plants may receive supplemental supply of all color spectra that are necessary for photosynthesis during all stages of growth of the plant for better or even the best result of growth. Thus, such a cold cathode fluorescent lamp tube based light fixture is only good for regular lighting and illumination and if it is used for indoor cultivation of plants, further improvements of the structure of such a cold cathode fluorescent lamp tube based light fixture would be necessary.

SUMMARY OF THE INVENTION

The conventional cold cathode fluorescent lamp tube based light fixture generates only a single color of light and this does not allow for irradiation of plants with various color spectra of light or change or mixture of multiple different color spectra of light in order to supply supplemental color spectra that are necessary to the growth of the plants in a timely manner in each of the stages of growth of the plant for achieving better or even best result of growth.

The present invention provides a color cover/change/mixture structure of a light bulb/tube/fixture, of which an illustrative example is a light fixture having a light source formed of a cold cathode fluorescent lamp tube, which generally comprises constituent components including an enclosure, a base, a cold cathode fluorescent lamp tube, and one or multiple color covers. The enclosure is a tubular body having a non-light-transmitting or light-transmitting top and a light-transmitting bottom. The enclosure is provided, in an interior thereof, with grooved track on two opposite sides. The base is a flat plate body having a bottom surface to which retention pawls are formed for engaging and retaining the cold cathode fluorescent lamp tube on the base the bottom surface and is disposed, after being combined with the cold cathode fluorescent lamp tube, inside the enclosure in such a way that two opposite edges of the plate body are respectively received and retained in the grooved tracks of the two sides of the interior of the enclosure. A head is then coupled to each of two ends of the enclosure to form a light tube based light fixture. The color covers are annular light-emitting elastic long/short covers having a proper size and is close to or slightly greater than a semi-circular configuration or are cylindrical sleeve-like annular light-transmitting elastic long/short covers so that a single one or a plurality of color covers of different colors may be coupled to a bottom surface or a light-transmitting surface of the enclosure or sleeve may directly fit over the enclosure.

The present invention provides a color cover/change/mixture structure of a light bulb/tube/fixture, which involves a single one or a plurality of color covers of different colors that are clamped to or directly fit over a bottom surface or a light-transmitting surface of the enclosure to allow vegetables/fruits planted in various sections of an indoor area to receive, in addition to the basic light spectrum emitting from a color light tube, supplemental supply of necessary light spectra provided by each of the color covers so that the light fixture may generate multiple sections of different colors or provide various irradiation light colors at the same time within an extremely small, fixed area with a single light source, allowing the plant growers to determine and select, among the color covers, desired ones of the covers having desired colors according to experiences or public knowledge available from agricultural books. With a cold cathode fluorescent lamp tube based light fixture of such a structure applied to indoor cultivation of plants, the plants may receive irradiation of light of different spectra and supplemental supply of various light spectra that are required for different stages of plant growth can be achieved to ensure better or even the best result of growth of the plants.

The present invention provides a technical solution that is illustrated with a light fixture that involves a cold cathode fluorescent lamp tube as a light source, but is not limited such a light fixture. Light fixtures that are provided for illumination and lighting can be modified with the embodiments disclosed in the present invention by incorporating the color covers with light bulbs, light tubes, and light fixtures, which are all covered and protected with a patent sought for the present invention.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
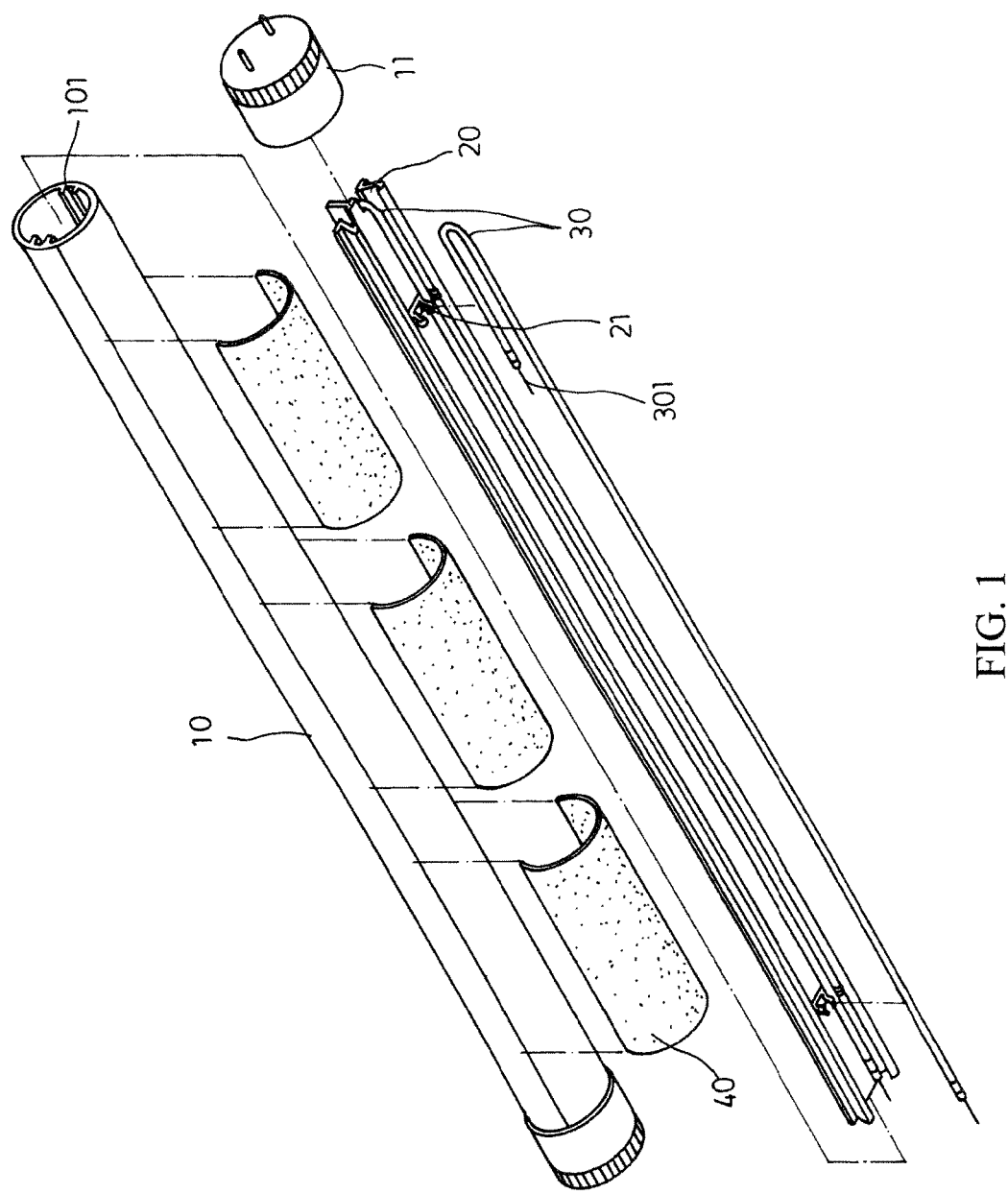
FIG. 1 is an exploded view showing the present invention embodied as a light fixture in the form of a light tube.
Figure 2:
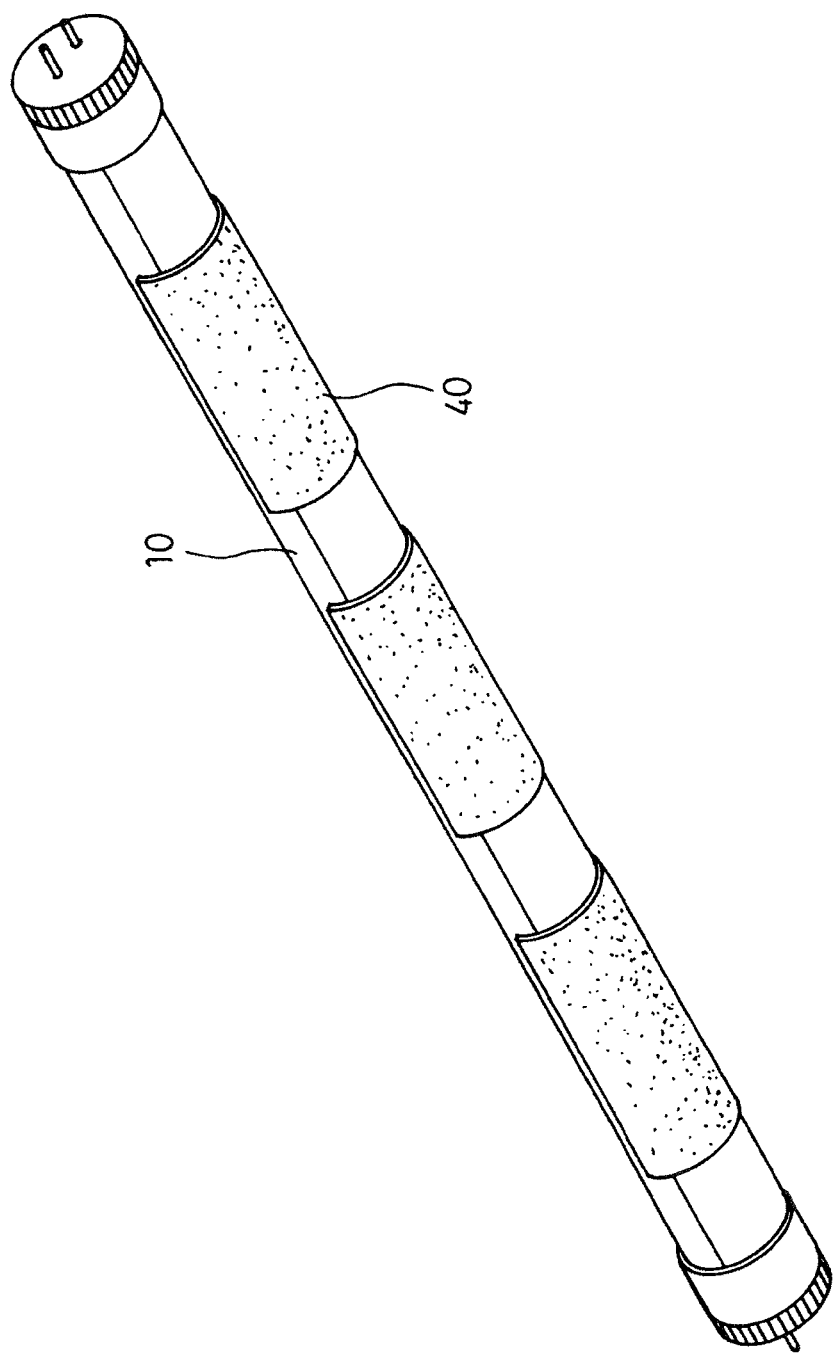
FIG. 2 is a perspective view showing the present invention embodied as a light fixture in the form of a light tube.
Figure 7:
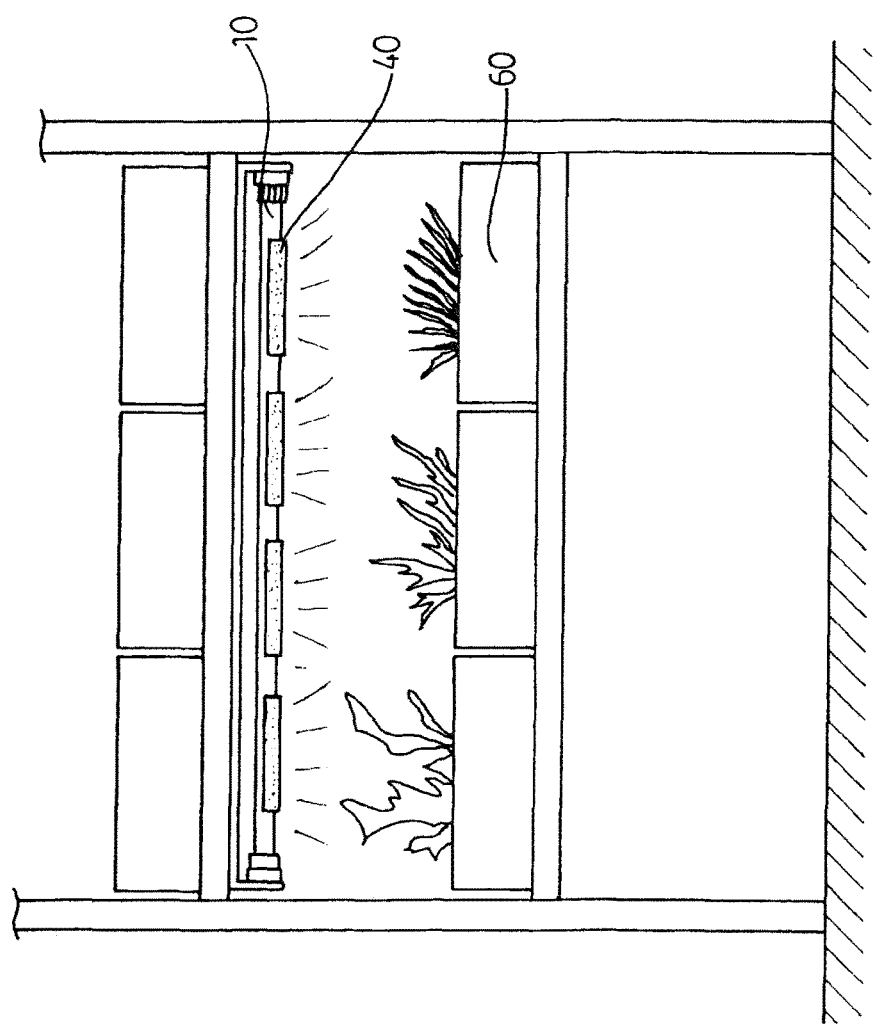
FIG. 7 is a schematic view illustrating an application of the present invention.

Referring to FIGS. 1, 2, and 7, the present invention provides a color cover/change/mixture structure of a light bulb/tube/fixture, which will also be referred to as a light bulb/tube/fixture color cover/change/mixture structure. In an embodiment, the light fixture is embodied in the form of a light tube, which generally comprises constituent components, including an enclosure 10, a base 20, cold cathode fluorescent lamp tubes 30, and color covers 40. The enclosure 10 is a tubular body having a non-light-transmitting or light-transmitting top and a light-transmitting bottom. The enclosure 10 is provided, in an interior thereof, with grooved tracks 101 respectively formed on two opposite sides thereof. The base 20 is a flat plate body having a top surface that is provided thereon with necessary electrical components (not shown) and a bottom surface that is provided with a plurality of retention pawls 21. The cold cathode fluorescent lamp tubes 30 are each a tubular light emitting that is extremely slender and has two ends each provided with a connector 301 and is hooked by and coupled with the retention pawls 21 to the bottom surface of the base 20, wherein the connectors 301 on the two ends thereof are in electrical connection with the electrical components provided on the base 20 so that when the base 20 and the cold cathode fluorescent lamp tubes 30 are combined and collectively disposed into the enclosure 10, the plate body of the base 20 are received, with two opposite edges thereof, in the grooved tracks 101 on the two sides of the interior of the enclosure 10. A head 11 is then attached and mounted to each of two ends of the enclosure 10 to form a light tube like cold cathode fluorescent lamp tube based light fixture, wherein the heads 11 are in electrical connection with the electrical components provided on the base 20. The color covers 40 are elastic long/short covers that are annular in shape and are light transmitting configured in the form of a semi-cylinder having an inside diameter close to an outside diameter of the enclosure 10 so that a single one color cover or a plurality of color covers 40 of different colors may be directly fit over and thus elastically clamp or mount to the bottom surface or the light-transmitting surface of the enclosure 10 to allow the light fixture to generate different colors of irradiation light in multiple sections. As shown in FIG. 7, the cold cathode fluorescent lamp tube based light fixture having such a structure is applicable to indoor plant cultivation, wherein in addition to basic light spectrum emitting from a color light tube, vegetables planted in different indoor zones may be individually supplemented with individual, different light spectra with the arrangement of such color covers, whereby the light fixture may generate and emit multiple sections or zones of different colors and may provide, simultaneously, multiple colors of irradiation light in a relatively small, fixed section with one single light source, allowing the plant growers to determine and select, among the color covers, desired ones of the covers having desired colors according to experiences or public knowledge available from agricultural books and thus, the plants may receive irradiation of light of different spectra and supplemental supply of various light spectra that are required for different stages of plant growth can be achieved to ensure better or even the best result of growth of the plants.

Figure 3:
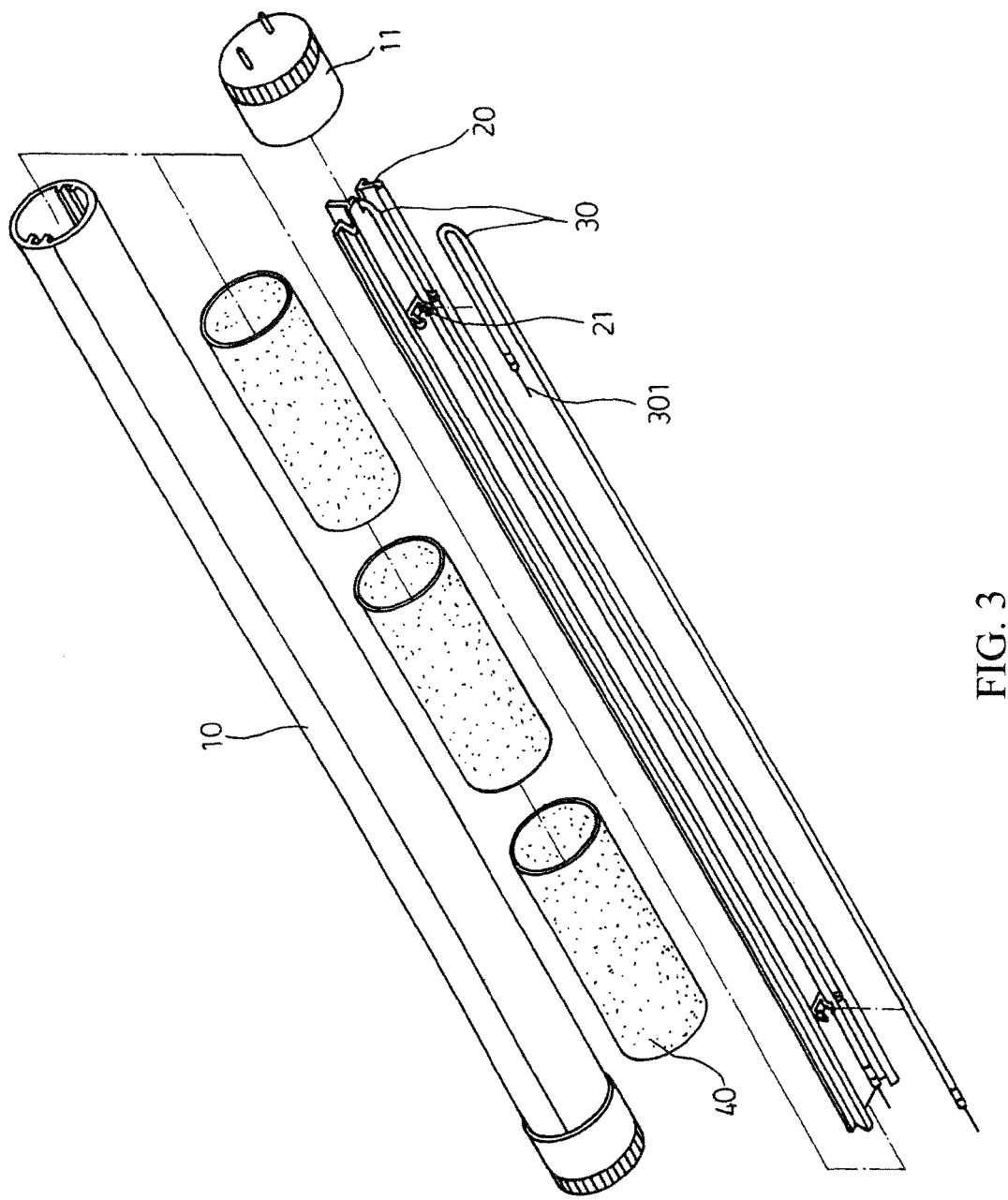
FIGS. 3 and 4 are views illustrating change of a structure of the present invention embodied as a light fixture in the form of a light tube.
Figure 4:
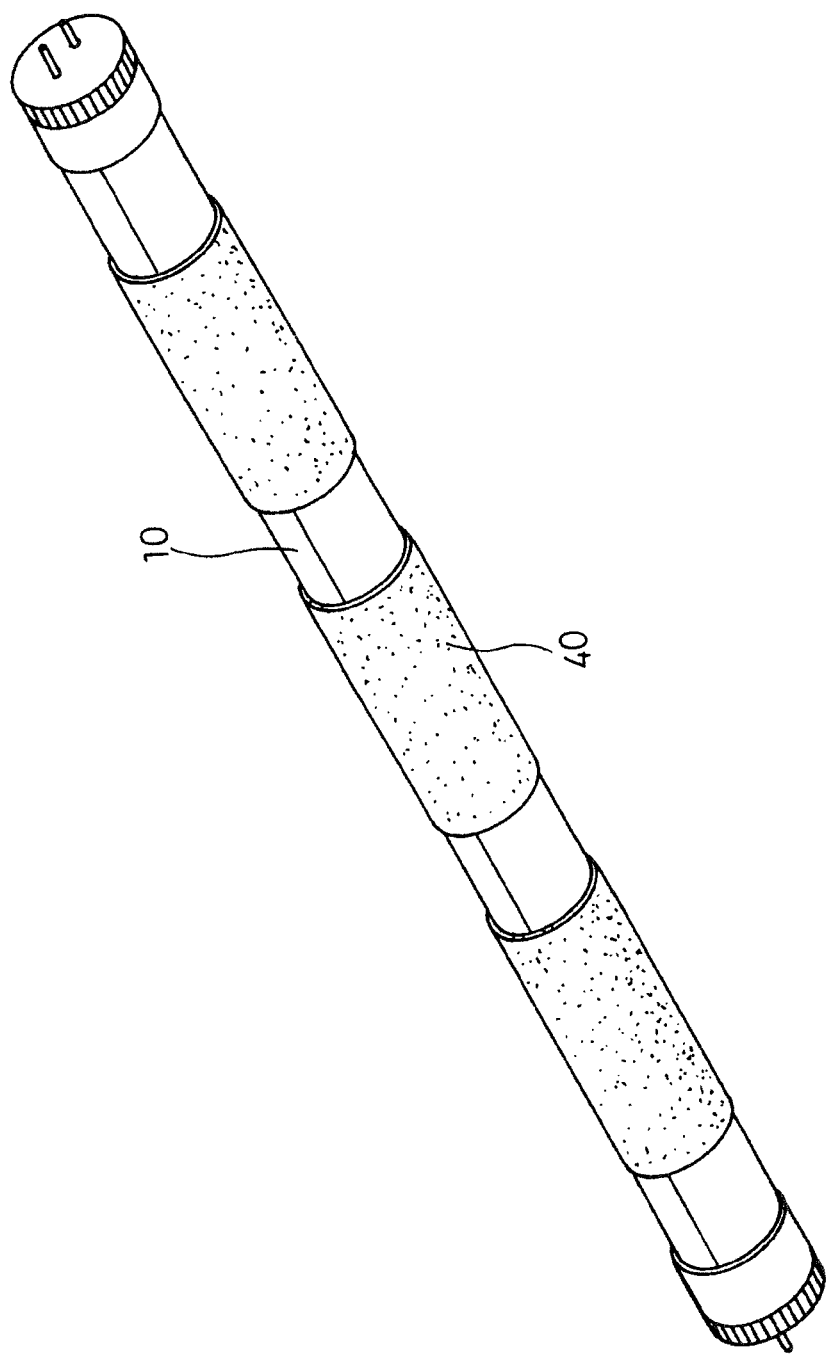

Referring to FIGS. 3 and 4, in an embodiment of the light bulb/tube/fixture color cover/change/mixture structure according to the present invention, the light fixture is made in the form of a light tube, in which the color covers 40 are elastic long/short covers that are cylindrical in shape and are light transmitting, having an inside diameter slightly greater than an outside diameter of the enclosure 10 to allow a single one or a plurality of color covers 40 of different colors to selectively and directly fit over and encompassing the enclosure 10 so that the light fixture may generate multiple sections of different colors of irradiation light.

Figure 5:
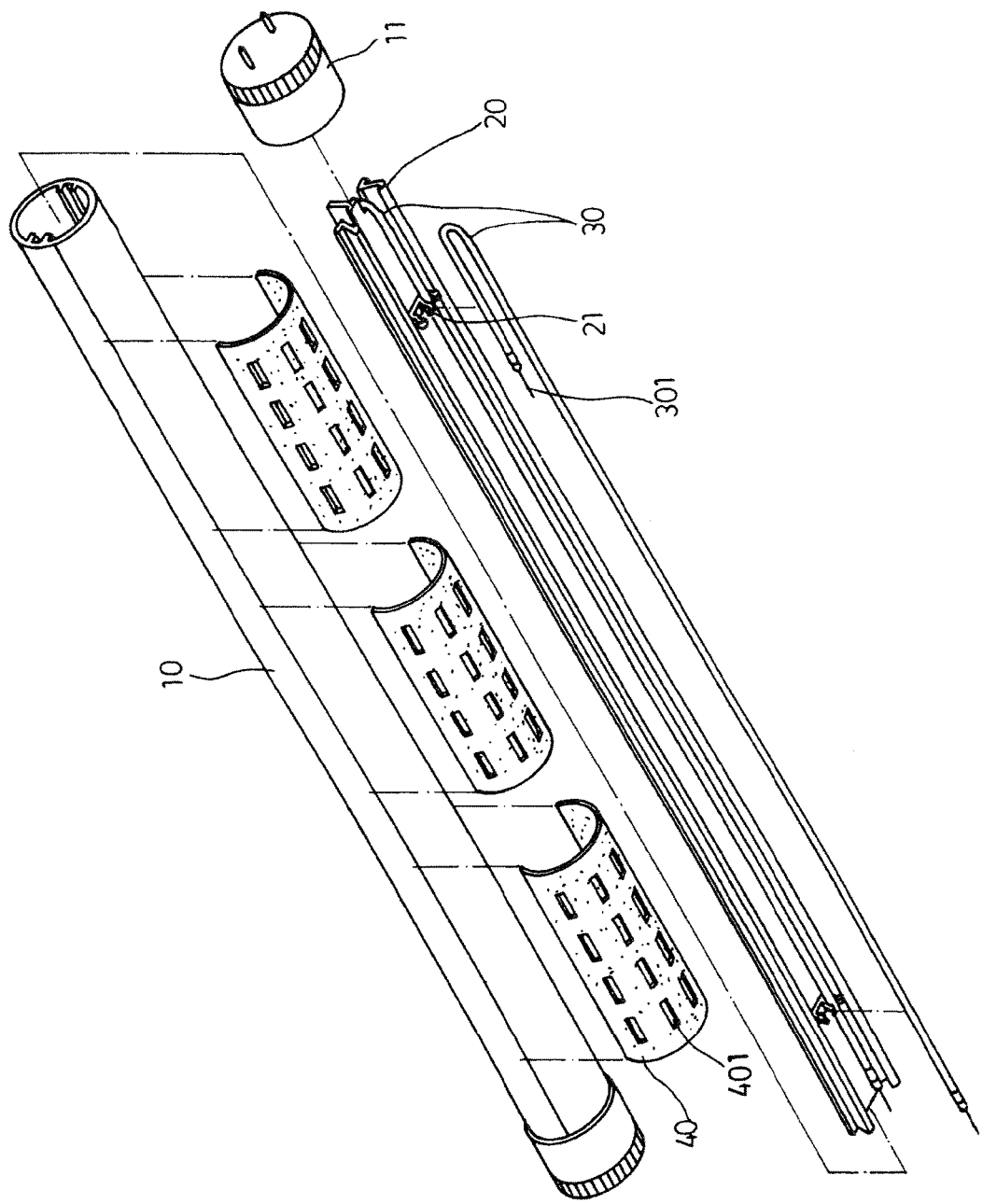
FIG. 5 is a view illustrating change of a color cover of the present invention embodied in the form of a light tube.
Figure 6:
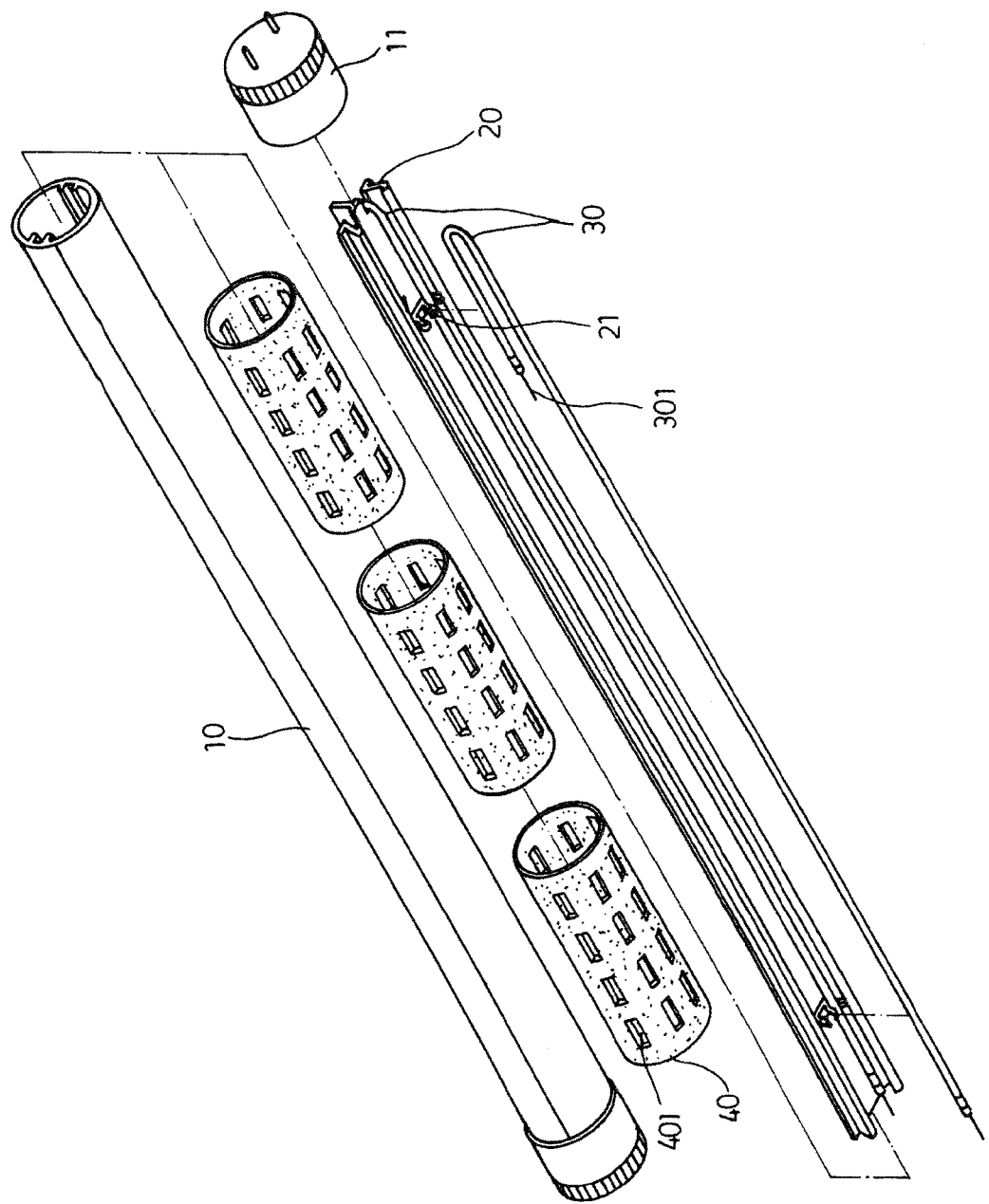
FIG. 6 is a view illustrating change of a color cover of the present invention embodied in the form of a light tube.

Referring to FIGS. 5 and 6, in an embodiment of the light bulb/tube/fixture color cover/change/mixture structure according to the present invention, the light fixture is made in the form of a light tube, in which the color covers 40 are each formed with a plurality of through holes 401, so as to allow each of the color covers 40 to receive a relatively large amount of basic light spectrum emitting from a color light tube to combine with each of the color covers 40 to generate colors of different light spectra.

Figure 8:
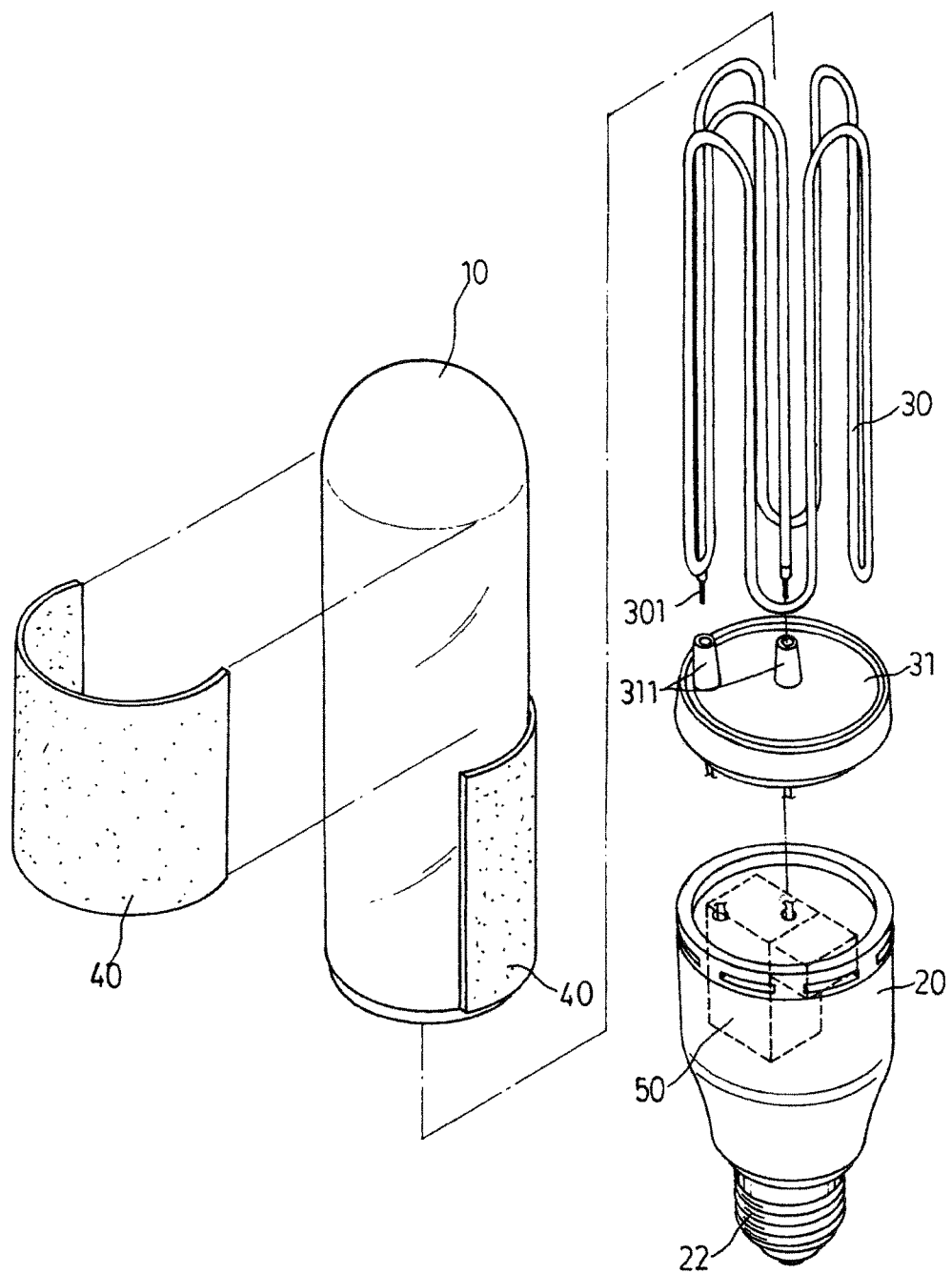
FIG. 8 is an exploded view showing the present invention embodied as a light fixture in the form of a light bulb.
Figure 9:
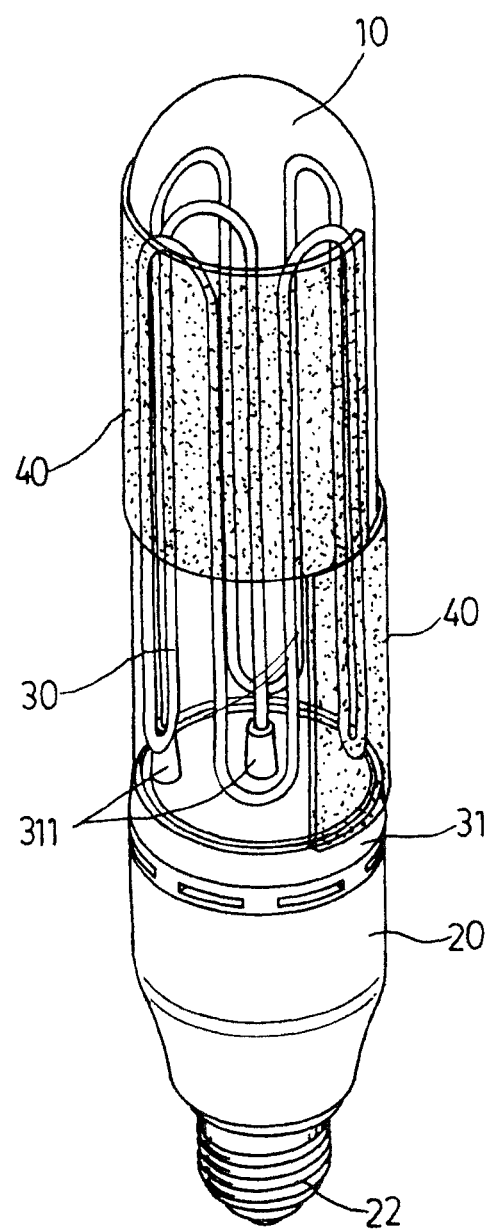
FIG. 9 is a perspective view showing the present invention embodied as a light fixture in the form of a light bulb.

Referring to FIGS. 8 and 9, in an embodiment of the light bulb/tube/fixture color cover/change/mixture structure according to the present invention, the light fixture is made in the form of a light bulb, which generally comprises constituent components, including an enclosure 10, a base 20, a cold cathode fluorescent lamp tube 30, a seat 31, and color covers 40. The enclosure 10 is a hood or housing that is light transmitting and has a bottom in which an opening is formed and a circumference that also comprises openings/ through holes formed therein. The base 20 is provided therein with necessary electrical components 50 and has a bottom that is provided with a head 22 in electrical connection with the electrical components 50. The seat 31 is connected to a top end of the base 20 and the seat 31 is provided thereon with two insertion sockets 311 in electrical connection with the electrical components 50 of the base 20. The cold cathode fluorescent lamp tube 30 is an extremely slender, curved, tubular light emitting body that has two ends respectively provided with connectors 301 insertable into and connected with the insertion sockets 311 of the seat 31. The color covers 40 are elastic long/short covers that are annular in shape and are light transmitting configured in a semi-cylindrical form having an inside diameter close to an outside diameter of the enclosure 10 so that a single one color cover or a plurality of color covers 40 of different colors may be directly fit over and thus elastically clamp or mount to a surface of the enclosure 10 with the enclosure 10 enclosing or housing the cold cathode fluorescent lamp tube 30 and the bottom thereof coupled to the seat 31 to form a cold cathode fluorescent lamp tube based light fixture in the form of a light bulb. Further, due to the arrangement of the color covers 40, the light fixture may generate multiple sections of different colors of irradiation light.

Figure 10:
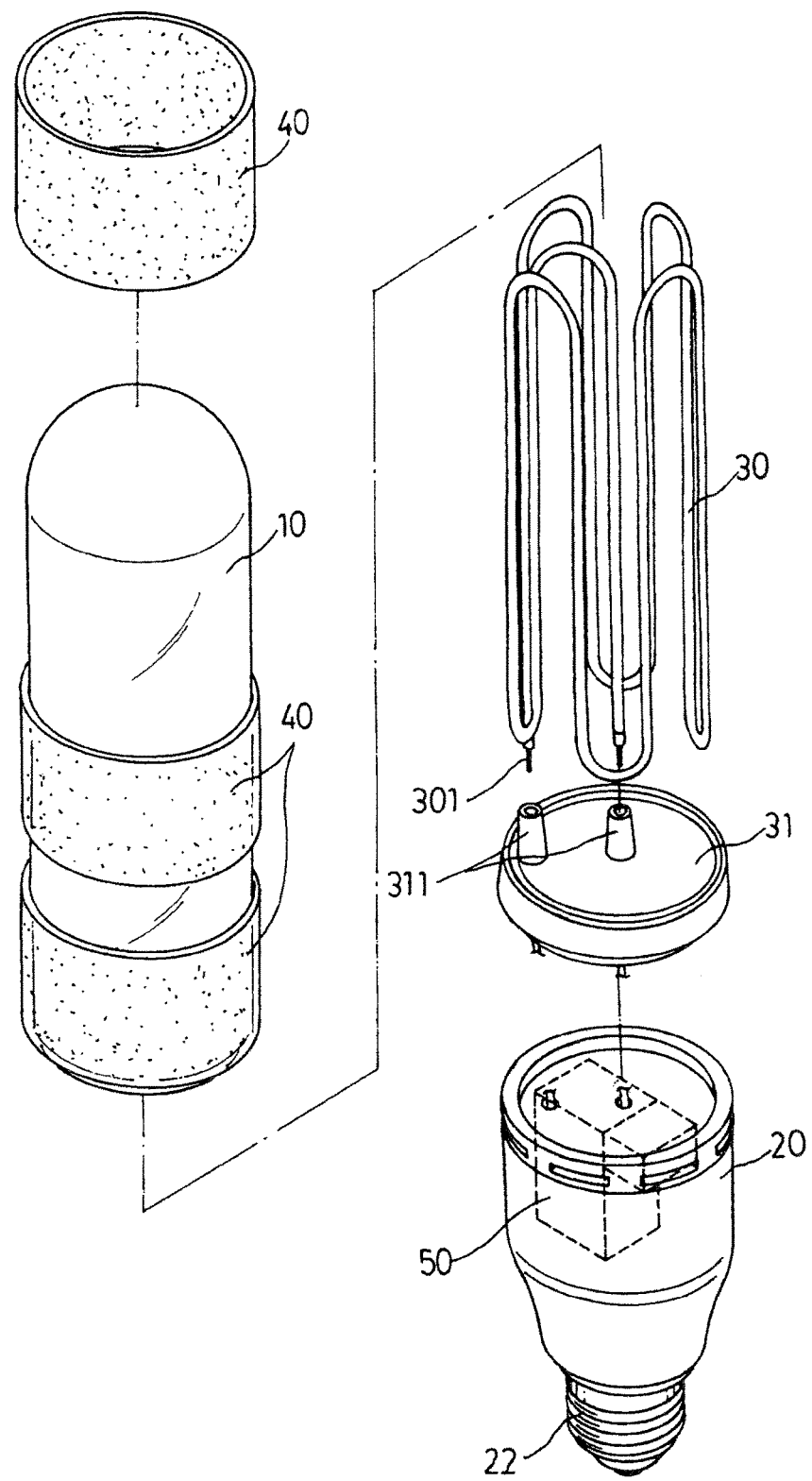
FIG. 10 is a view illustrating change of a structure of the present invention embodied as a light fixture in the form of a light bulb.

Referring to FIG. 10, in an embodiment, the light bulb/tube/fixture color cover/change/mixture structure according to the present invention, the light fixture is made in the form of a light bulb, wherein the color covers 40 are long/short sleeves or covers that are of the form of cylindrical sleeves and are light transmitting, having an inside diameter slightly greater than an outside diameter of the enclosure 10 to allow a single one or a plurality of color covers 40 of different colors to selectively and directly fit over and encompassing the enclosure 10 so that the light fixture may generate multiple sections of different colors of irradiation light.

Figure 11:
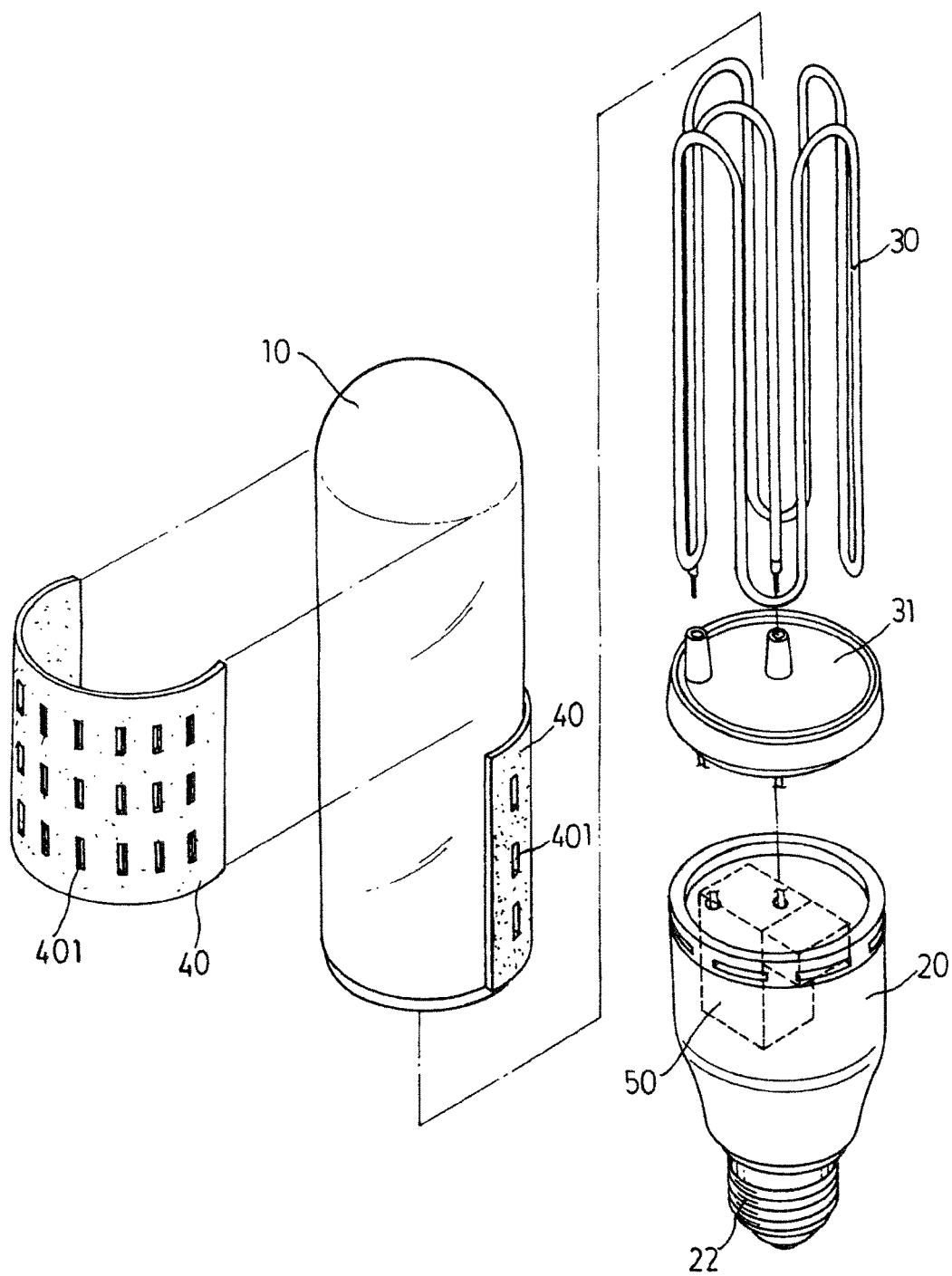
FIG. 11 is a view illustrating change of a color cover of the present invention embodied in the form of a light bulb.
Figure 12:
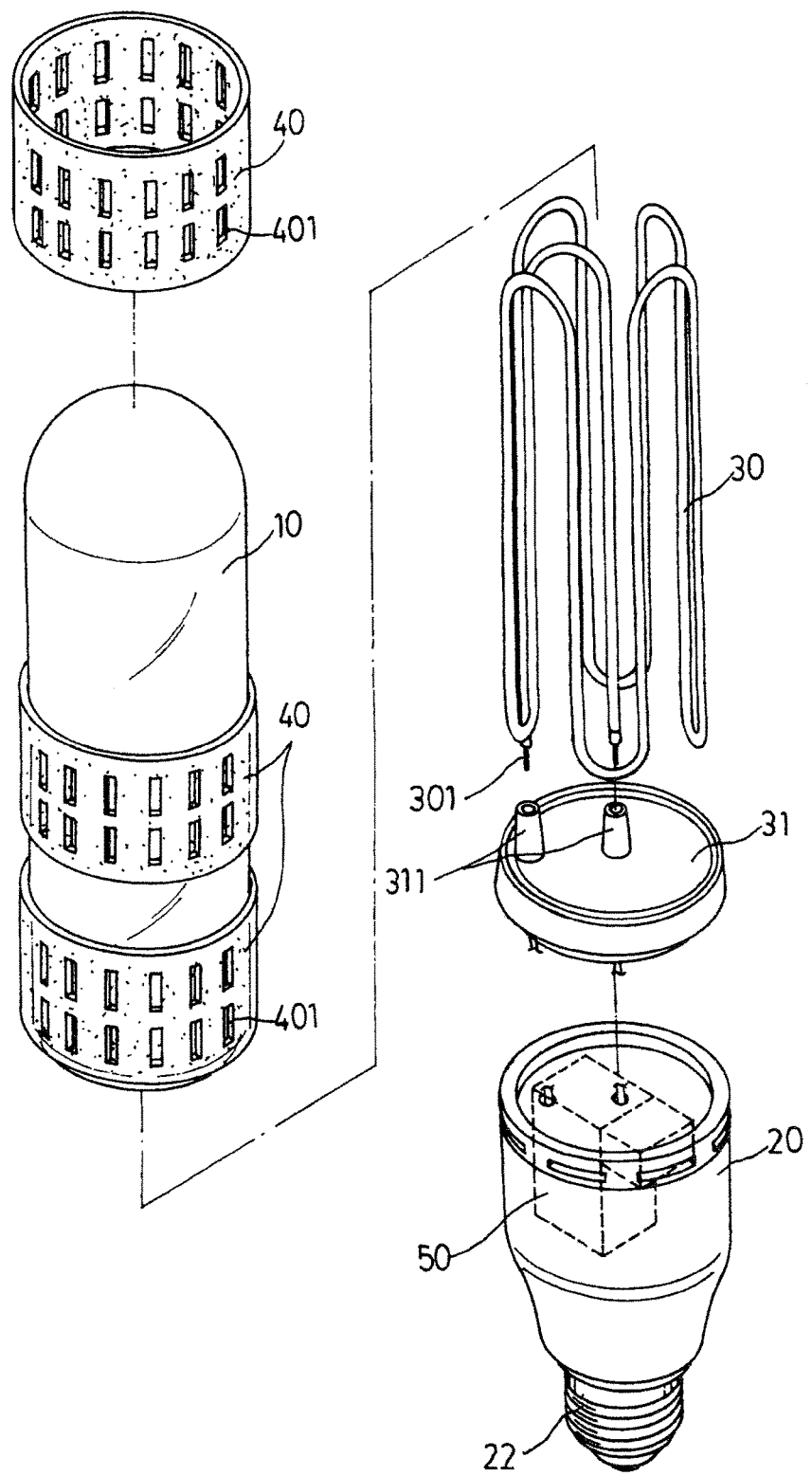
FIG. 12 is a view illustrating change of a color cover of the present invention embodied in the form of a light bulb.

Referring to FIGS. 11 and 12, in an embodiment of the light bulb/tube/fixture color cover structure according to the present invention, the light fixture is made in the form of a light bulb, in which the color covers 40 are each formed with a plurality of through holes 401, so as to allow each of the color covers 40 to receive a relatively large amount of basic light spectrum emitting from a color light tube to combine with each of the color covers 40 to generate colors of different light spectra of the cold cathode fluorescent lamp tube based light fixture color covering structure.

The above embodiments of the present invention are described with reference to standing light bulbs that are taken as examples of illustration, but the present invention is not limited to such light bulb structures. Light fixtures that are provided for illumination and lighting can be modified with the embodiments disclosed in the present invention by incorporating the color covers. Examples of such light fixtures that may be covered and protected with a patent sought for the present invention includes garden lights, street lamps, track lights, table lights, or drawing lights.

Figure 13:
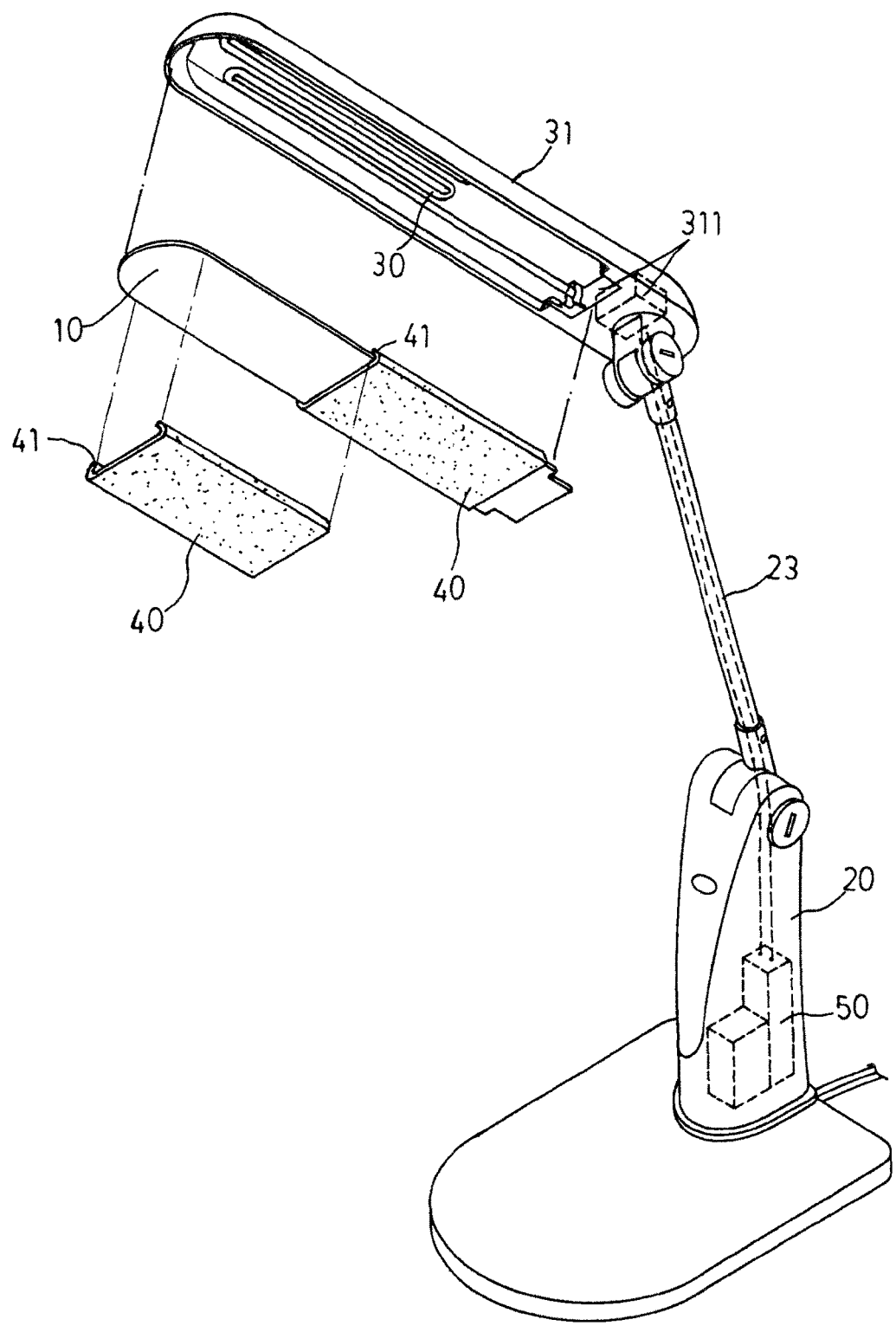
FIG. 13 is a perspective view, partly exploded, illustrating the present invention embodied as a light fixture in the form of a desktop lamp.

Referring to FIG. 13, in an embodiment of the light bulb/tube/fixture color cover/change/mixture structure according to the present invention, the light fixture is embodied as a desktop lamp, which generally comprises constituent components, including an enclosure 10, a base 20, a cold cathode fluorescent lamp tube 30, a seat 31, and the color covers 40. The enclosure 10 is a light-transmitting flat plate body serving as a diffusion board for softening and homogenizing light. The base 20 is provided thereon with necessary electrical components 50 and has a top to which a link bar 23 is mounted. The seat 31 has an end connected to the link bar 23 of the base 20. The seat 31 is provided therein with insertion sockets 311 in electrical connection with the electrical components 50 provided in the base 20. The cold cathode fluorescent lamp tube 30 is an extremely slender tubular light emitting body having two ends respectively provided with connectors 301 such that the connectors 301 of the two ends are respectively insertable into and connected to the insertion sockets 311 of the seat 31. The color covers 40 are each a flat plate body having a width that is close to and slightly greater than a width between two edges of the enclosure 10 and are light transmitting and elastic, in which the plate bodies are each structured to form a clamp plate 41 having two ends of the plate bent upwards so that the clamp plates 41 may mount the color covers 40 to a bottom of the enclosure 10 and then, the enclosure 10 is coupled to a bottom of the seat 31 or directly fit to the seat 31 to form a cold cathode fluorescent lamp tube based light fixture in the form of a desktop lamp, whereby a single one or a plurality of color covers 40 of different colors may be directly fit over the a surface of the enclosure 10 or clamp or mount to the seat 31 to allow the light fixture to generate multiple sections of different colors of irradiation light.

Figure 14:
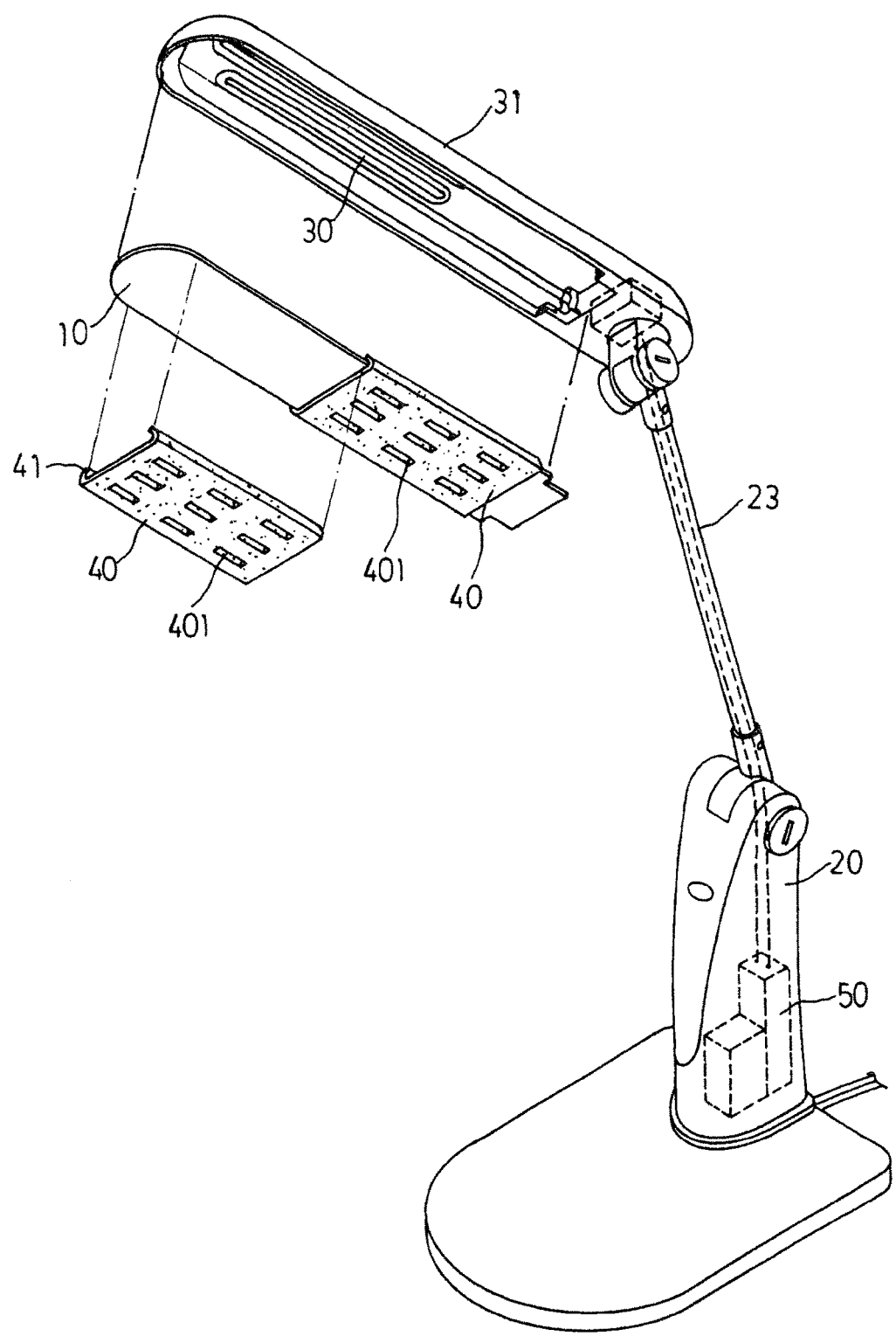
FIG. 14 is a view illustrating change of a color cover of the present invention embodied in the form of a desktop lamp.

Referring to FIG. 14, in an embodiment of the light bulb/tube/fixture color cover/change/mixture structure according to the present invention, the light fixture is made in the form of a desktop lamp, wherein the color covers 40 are each formed with a plurality of through holes 401, so as to allow each of the color covers 40 to receive a relatively large amount of basic light spectrum emitting from a color light tube to combine with each of the color covers 40 to generate colors of different light spectra of the cold cathode fluorescent lamp tube based light fixture color covering structure.

The above embodiments of the present invention are described with reference to desktop lamps that are taken as examples of illustration, but the present invention is not limited to structures. Light fixtures that are provided for illumination and lighting can be modified with the embodiments disclosed in the present invention by incorporating the color covers. Examples of such light fixtures that may be covered and protected with a patent sought for the present invention includes garden lights, street lamps, track lights, table lights, or drawing lights.

Figure 15:
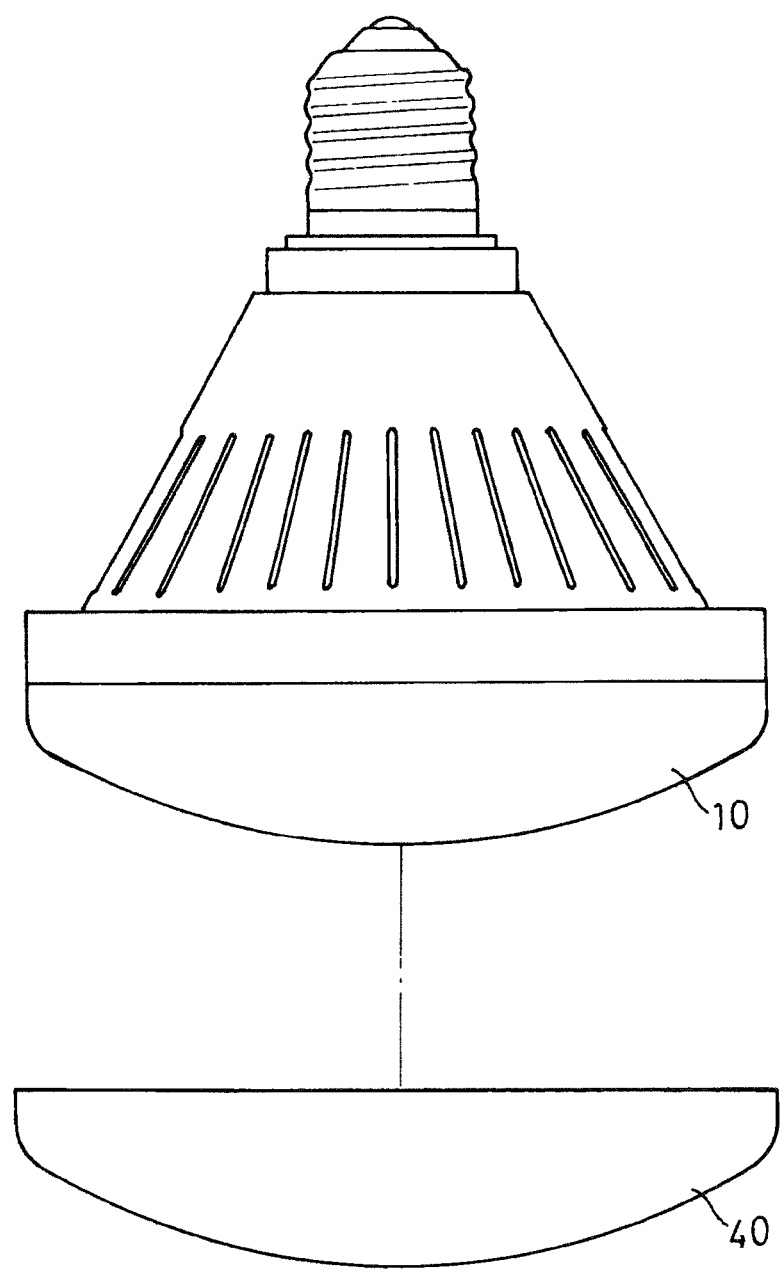
FIGS. 15-20 are views illustrating change of a color cover of the present invention embodied in the form of a disk-like bulb.
Figure 16:
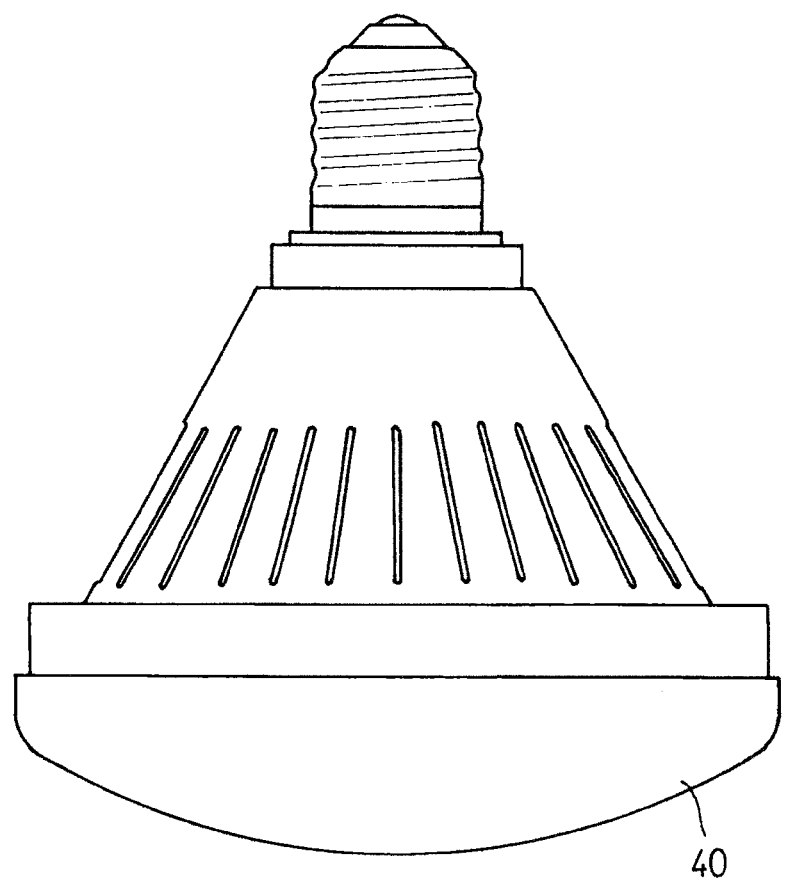
Figure 17:
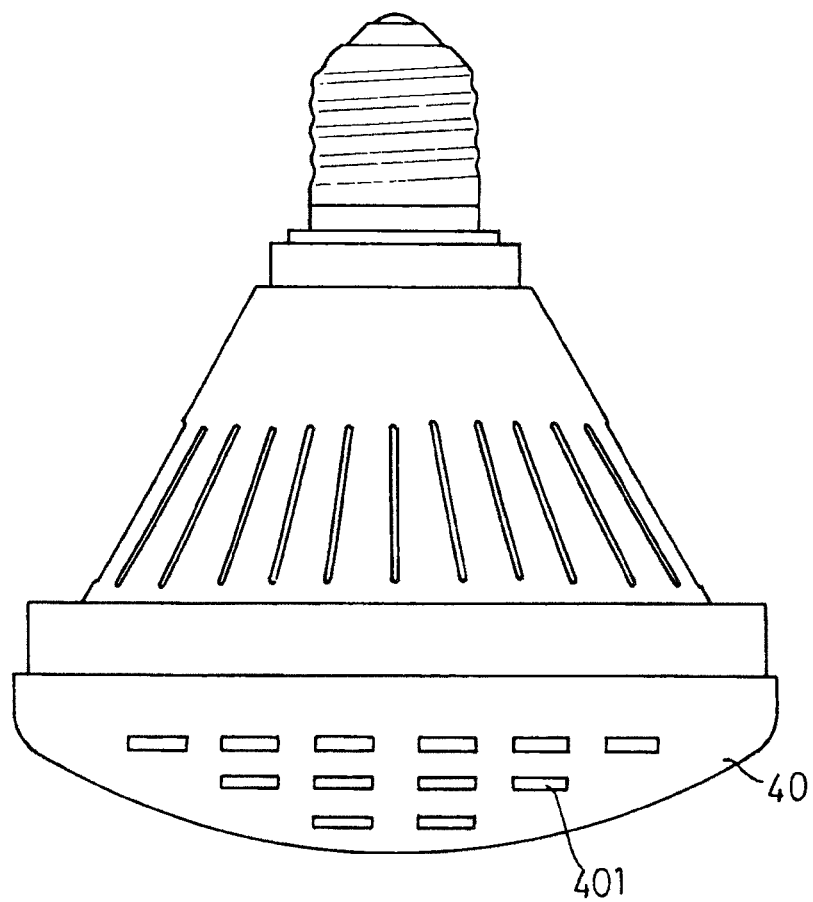
Figure 18:
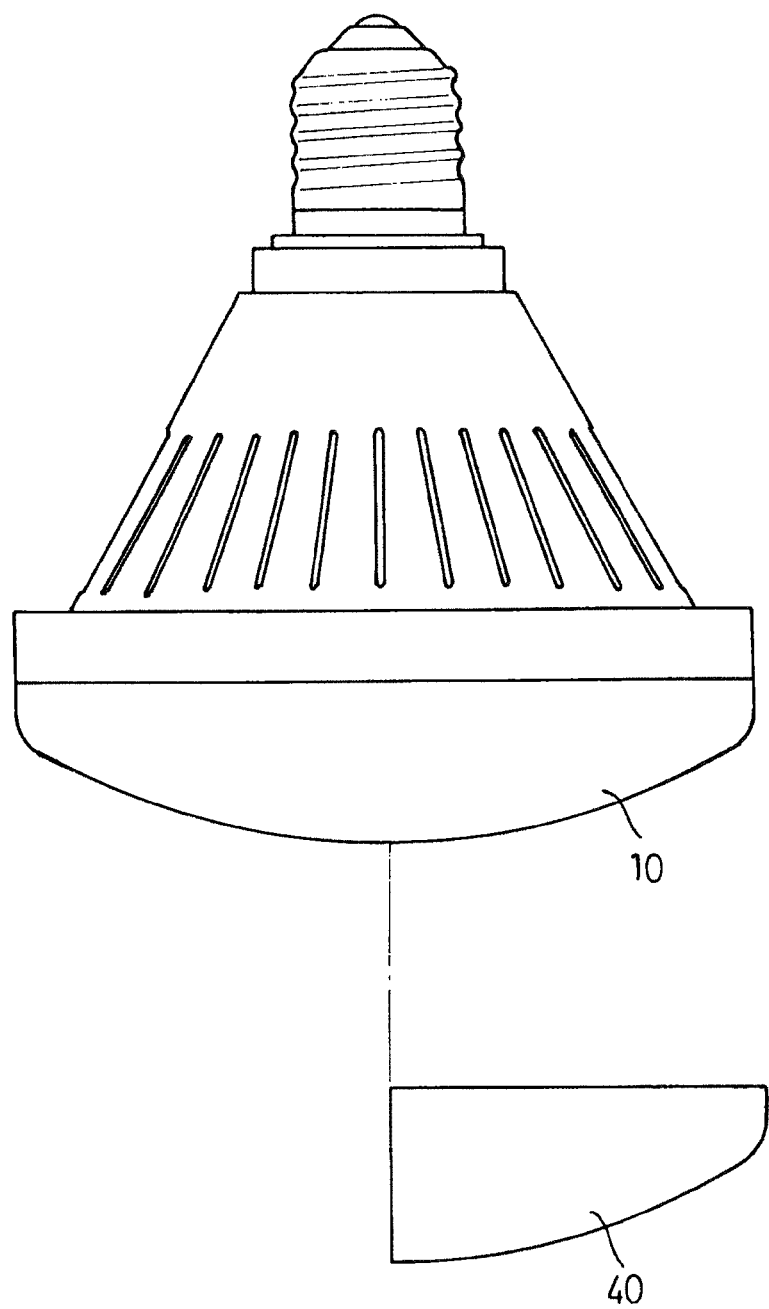
Figure 19:
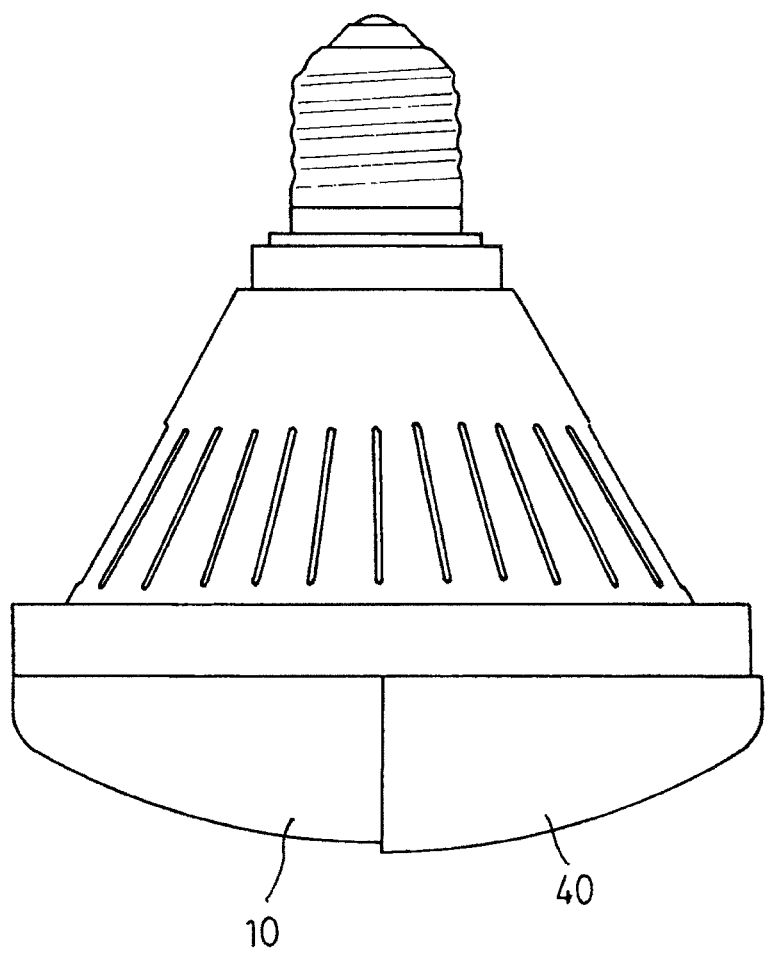
Figure 20:
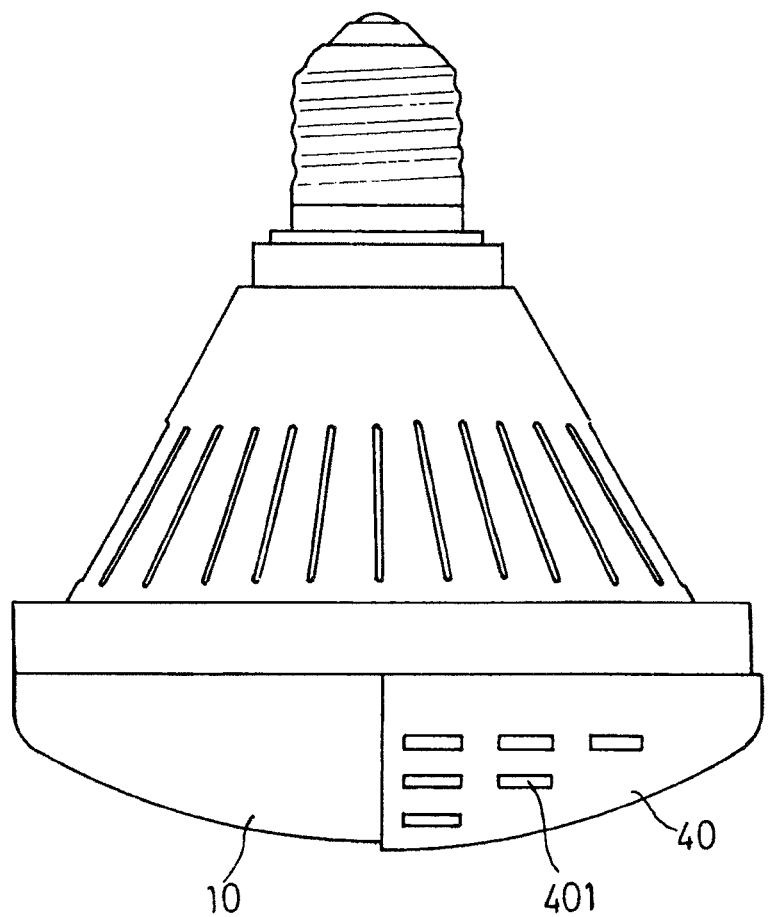

FIGS. 15-20 are views illustrating an embodiment of the light bulb/tube/fixture color cover/change/mixture structure according to the present invention in the form of a disk-like light bulb. As shown in FIGS. 15 and 16, a color cover 40 is a circular light-transmitting hood having an open top and an inside diameter slightly greater than an outside diameter of an enclosure/shade 10 so that a single one or a plurality of color covers 40 of different colors may be directly fit over and clamp to a surface of the enclosure/shade 10 to cover the enclosure 10, allowing the light bulb to generate different colors of irradiation light. As shown in FIG. 17, in an embodiment, the color cover 40 is formed with a plurality of through holes 401, so as to allow each of the color covers 40 to receive a relatively large amount of basic light spectrum emitting from a color light tube to combine with each of the color covers 40 to generate colors of different light spectra. FIGS. 18-20 illustrate a color cover 40 that is a semi-circular light-transmitting hood having an opening having an inside diameter slightly greater than an outside diameter of an enclosure/shade 10 so that a single one or a plurality of color covers 40 of different colors may be directly fit over and clamp to a surface of the enclosure/shade 10 to cover the enclosure 10, allowing the light bulb to generate different colors of irradiation light, in which the color cover 40 is formed with a plurality of through holes 401, so as to allow each of the color covers 40 to receive a relatively large amount of basic light spectrum emitting from a color light tube to combine with each of the color covers 40 to generate colors of different light spectra.

The above embodiments of the present invention are described with reference to disk-like light bulbs that are taken as example of illustration, but the present invention is not limited to such structures. Light fixtures that are provided for illumination and lighting can be modified with the embodiments disclosed in the present invention by incorporating the color covers. Examples of such light fixtures that may be covered and protected with a patent sought for the present invention includes garden lights, street lamps, track lights, table lights, or drawing lights.

Figure 21:
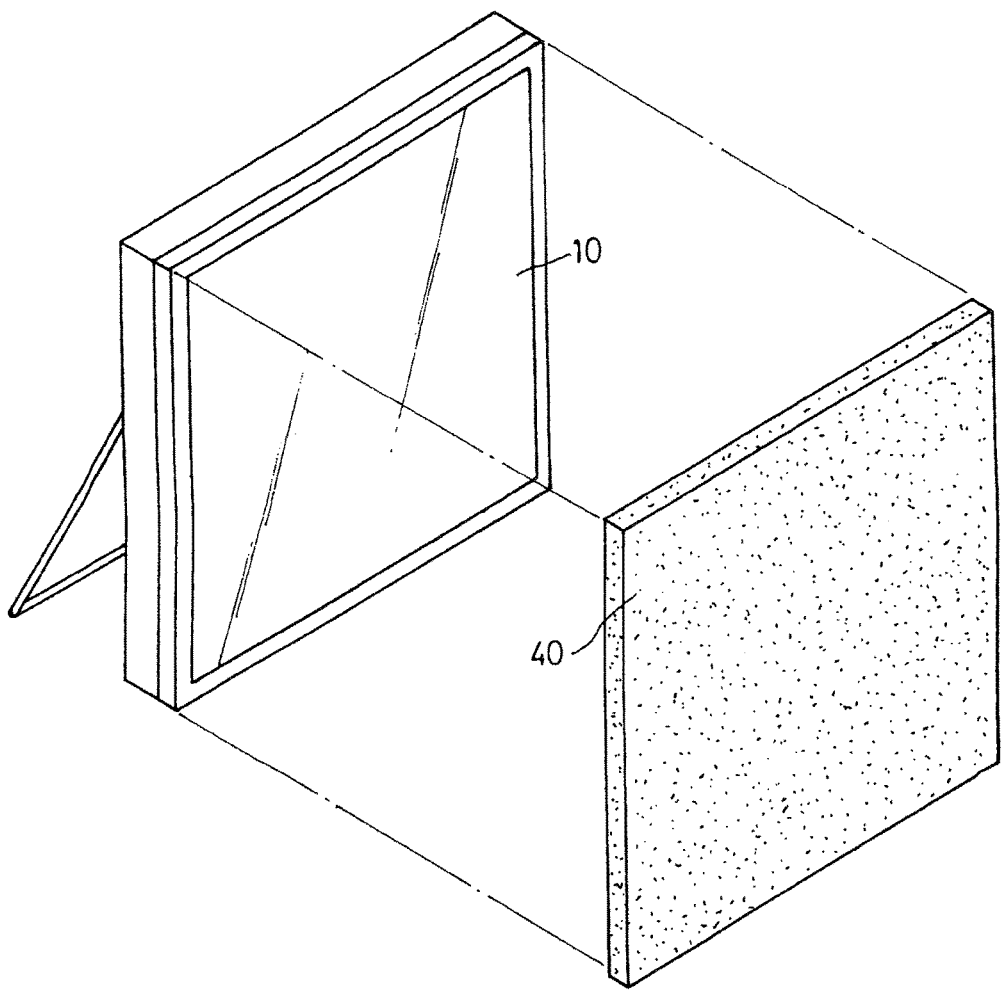
FIGS. 21-26 are views illustrating change of a color cover of the present invention embodied in the form of a projection lamp (planar lamp).
Figure 22:
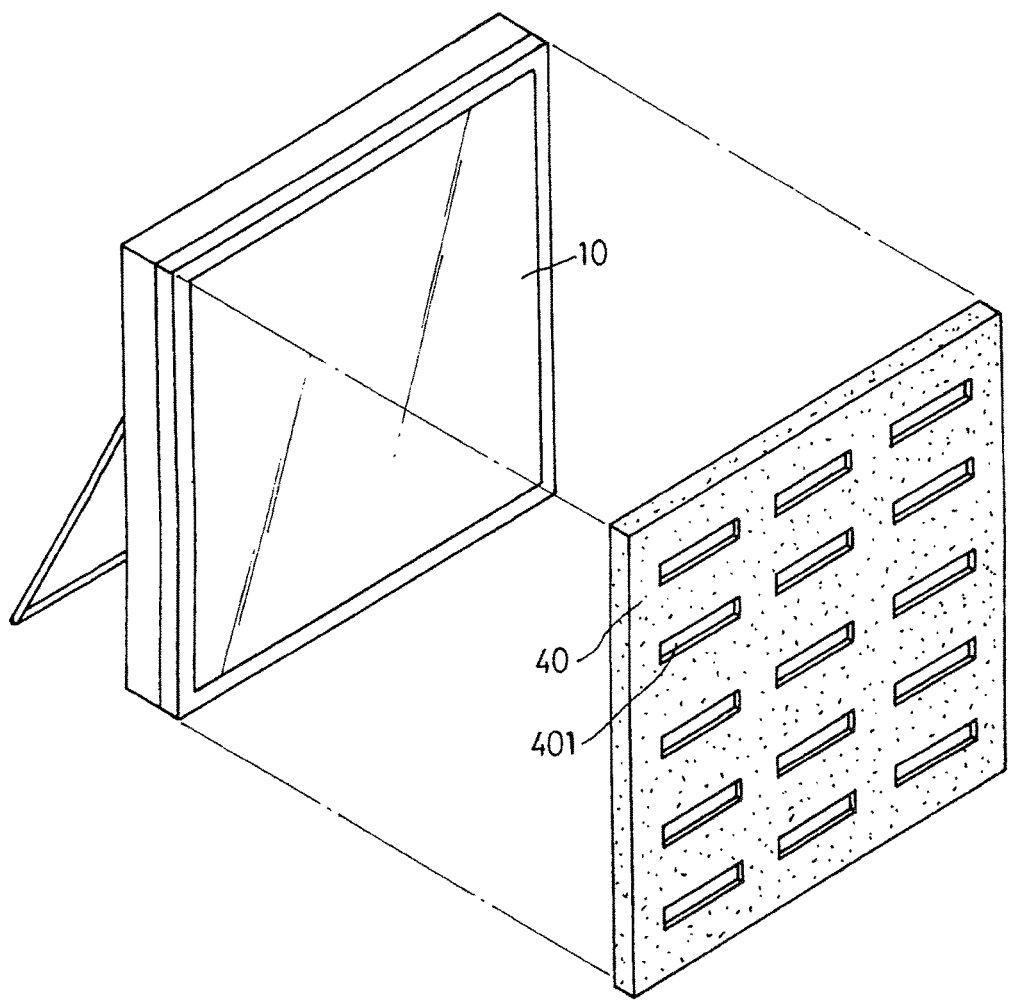
Figure 23:
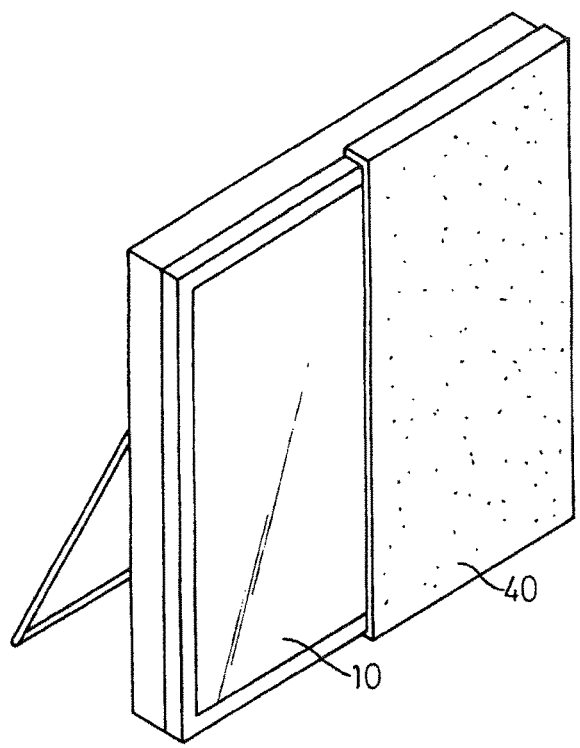
Figure 24:
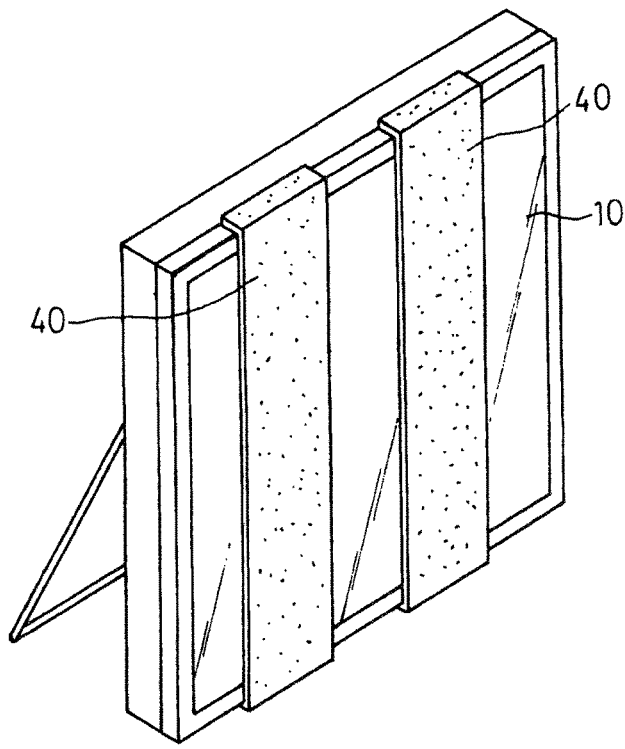
Figure 25:
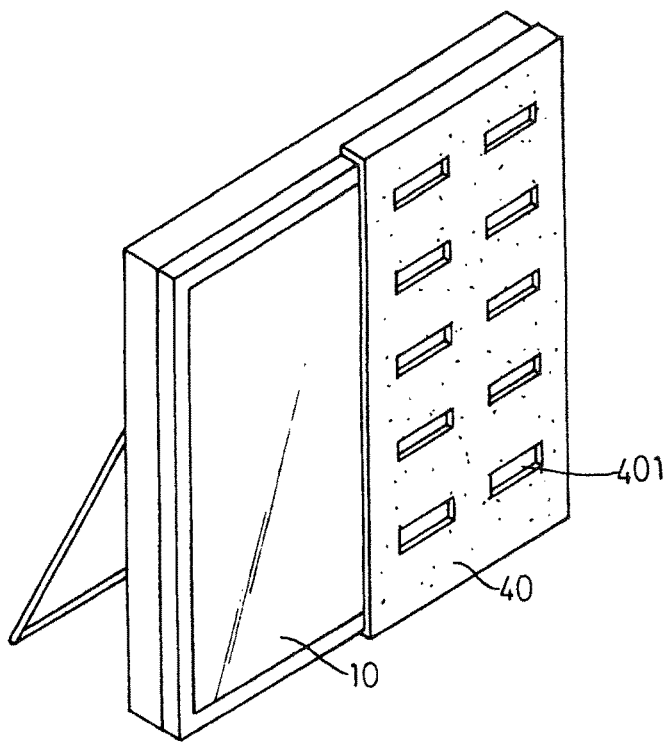
Figure 26:
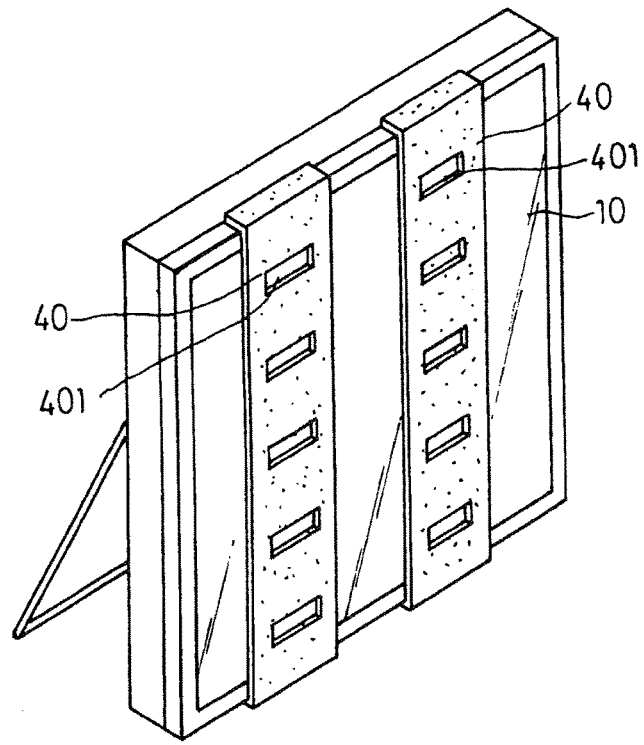

FIGS. 21-26 are views illustrating an embodiment of the light bulb/tube/fixture color cover/change/mixture structure according to the present invention in the form of a projection lamp (or planar lamp). As shown in FIG. 21, the color cover 40 is a square or rectangular light-transmitting hood having an opening slightly greater than an outer frame of an enclosure 10 to be directly fit to the enclosure 10, allowing the projection lamp (or planar lamp) to generate different colors of irradiation light. As shown in FIG. 22, in an embodiment, the color cover 40 is formed with a plurality of through holes 401, so as to allow each of the color covers 40 to receive a relatively large amount of basic light spectrum emitting from a color light tube to combine with each of the color covers 40 to generate colors of different light spectra. As shown in FIG. 23, the color cover 40 is a half of a square or rectangular light-transmitting hood having an opening slightly greater than an outer frame of an enclosure 10 to be directly fit to the enclosure/shade 10 to allow the projection lamp (or planar lamp) to generate different light spectra with a basic light spectrum in combination with the color covers 40. As shown in FIG. 24, in an embodiment, color covers 40 are rectangular light-transmitting clips having an opening that is slightly greater than an outer frame of the enclosure 10 so that a single one or a plurality of color covers 40 of different colors may be directly fit over and clamp to a surface of the enclosure/shade 10, allowing the projection lamp (or planar lamp) to generate, in addition to the basic light spectrum, different colors of irradiation light. As shown in FIGS. 25 and 26, in an embodiment, color covers 40 are each formed with a plurality of through holes 401, so as to allow each of the color covers 40 to receive a relatively large amount of basic light spectrum emitting from a color light tube to combine with the color covers 40 to generate colors of different light spectra.

The above embodiments of the present invention are described with reference to projection lamps (or planar lamps) that are taken as example of illustration, but the present invention is not limited to such structures. Light fixtures that are provided for illumination and lighting can be modified with the embodiments disclosed in the present invention by incorporating the color covers. Examples of such light fixtures that may be covered and protected with a patent sought for the present invention includes garden lights, street lamps, track lights, table lights, or drawing lights.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

We claim:

1. A color cover/change/mixture structure of a light bulb/tube/fixture, wherein the light fixture is in the form of a light tube and generally comprises an enclosure, a base, a cold cathode fluorescent lamp tube, and one or multiple color covers, wherein the enclosure is a tubular body having a non-light-transmitting or light-transmitting top and a light-transmitting bottom, the enclosure being provided, in an interior thereof, with grooved tracks respectively formed on two opposite sides thereof, the base being a flat plate body having a top surface that is provided thereon with necessary electrical components and a bottom surface that is provided with a plurality of retention pawls, the cold cathode fluorescent lamp tube being a tubular light emitting that is extremely slender and has two ends respectively provided with connectors and is hooked by and coupled with the retention pawls to the bottom surface of the base, wherein the connectors on the two ends are in electrical connection with the electrical components provided on the base so that when the base and the cold cathode fluorescent lamp tubes are combined and collectively disposed into the enclosure, the plate body of the base are received, with two opposite edges thereof, in the grooved tracks on the two sides of the interior of the enclosure, a head being then attached and mounted to each of two ends of the enclosure, wherein the heads are in electrical connection with the electrical components provided on the base, the color covers being elastic long/short covers that are annular in shape and are light transmitting configured in the form of a semi-circle having an inside diameter close to an outside diameter of the enclosure so that a single one color cover or a plurality of the color covers having different colors are directly fit over and clamp to the bottom surface or the light-transmitting surface of the enclosure, whereby with such a structure, the light fixture is allowed to generate multiple sections of different colors of irradiation light.

2. The color cover/change/mixture structure of the light bulb/tube/fixture according to claim 1, wherein the color covers are long/short sleeves or covers that are of the form of cylindrical sleeves and are light transmitting, having an inside diameter slightly greater than an outside diameter of the enclosure to allow a single one or a plurality of color covers of different colors to selectively and directly fit over the enclosure.

3. The color cover/change/mixture structure of the light bulb/tube/fixture according to claim 1, wherein the color covers are formed with a plurality of through holes.

4. The color cover/change/mixture structure of the light bulb/tube/fixture according to claim 2, wherein the color covers are formed with a plurality of through holes.

5. A color cover/change/mixture structure of a light bulb/tube/fixture, wherein the light fixture is in the form of a light bulb and generally comprises an enclosure, a base, a cold cathode fluorescent lamp tube, a seat, and one or multiple color covers, the enclosure being a hood that is light transmitting and has a bottom in which an opening is formed, the base being provided therein with necessary electrical components and having a bottom that is provided with a head in electrical connection with the electrical component, the seat being connected to a top end of the base, the seat being provided thereon with two insertion sockets in electrical connection with the electrical components of the base, the cold cathode fluorescent lamp tube being an extremely slender, curved, tubular light emitting body that has two ends respectively provided with connectors insertable into and connected with the insertion sockets of the seat, the color covers being elastic long/short covers that are annular in shape and are light transmitting configured in a semi-circular form having an inside diameter close to an outside diameter of the enclosure so that a single one color cover or a plurality of color covers of different colors are directly fit over and clamp to a surface of the enclosure with the enclosure enclosing the cold cathode fluorescent lamp tube and the bottom thereof coupled to the seat to form a cold cathode fluorescent lamp tube based light fixture in the form of a light bulb.

6. The color cover/change/mixture structure of the light bulb/tube/fixture according to claim 5, wherein the color covers are long/short sleeves or covers that are of the form of cylindrical sleeves and are light transmitting, having an inside diameter slightly greater than an outside diameter of the enclosure to allow a single one or a plurality of color covers of different colors to selectively and directly fit over the enclosure.

7. The color cover/change/mixture structure of the light bulb/tube/fixture according to claim 5, wherein the color covers are formed with a plurality of through holes.

8. The color cover/change/mixture structure of the light bulb/tube/fixture according to claim 6, wherein the color covers are formed with a plurality of through holes.

9. The color cover/change/mixture structure of the light bulb/tube/fixture according to claim 4, wherein the light fixture is in the form of a disk-like light bulb and the color covers are circular light-transmitting hoods or semi-circular clipping hood having an open top and an inside diameter slightly greater than an outside diameter of an enclosure so that a single one or a plurality of color covers of different colors are directly fit over and clamp to a surface of the enclosure to cover the enclosure, the color covers being provided with a plurality of through holes.

* * * * *